July 29, 1924.
J. J. HOPPES
1,503,124
HYDROELECTRIC POWER PLANT
Filed May 23, 1923   2 Sheets-Sheet 2
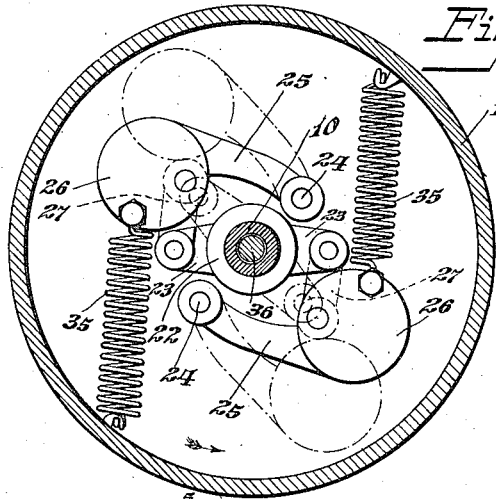
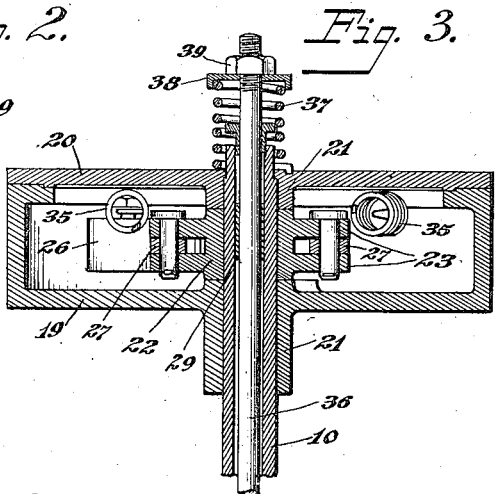
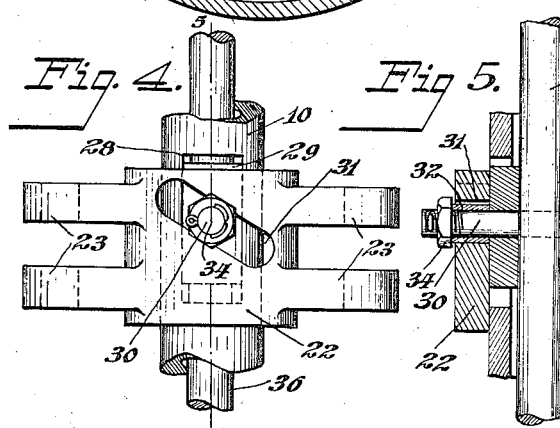
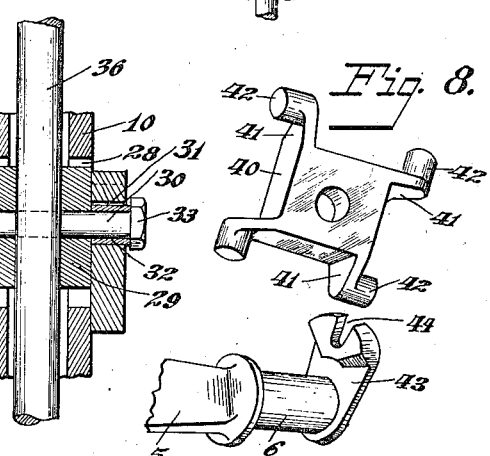
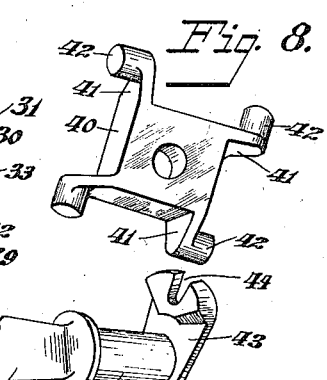
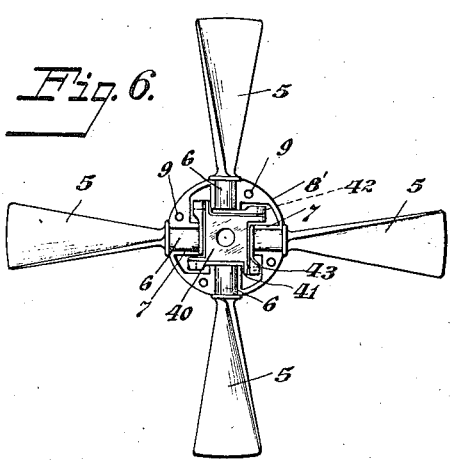
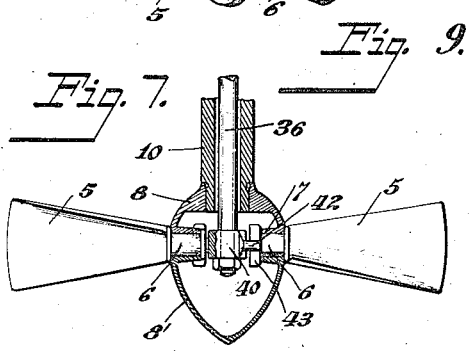
Inventor
John J. Hoppes
By
Attorneys Patented July 29, 1924.

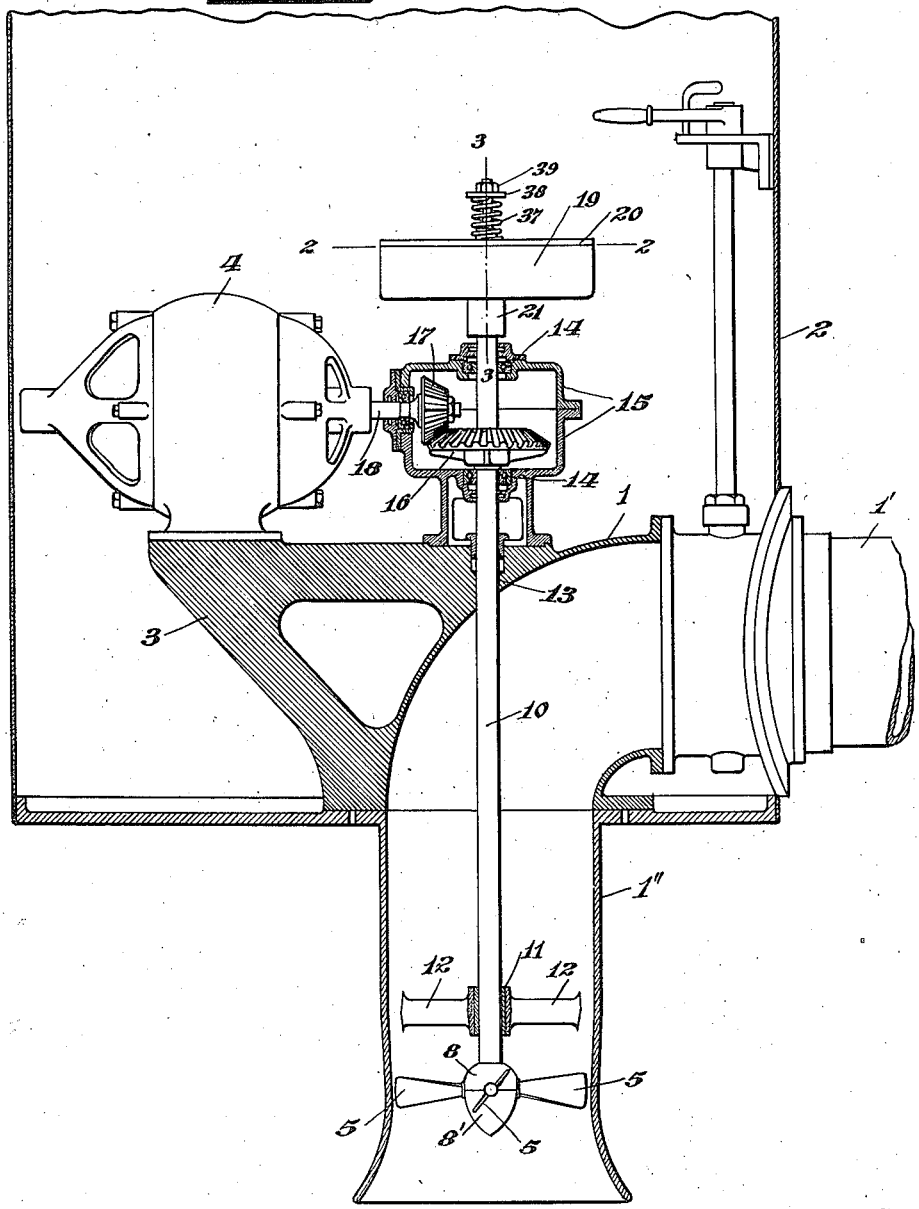

1,503,124

UNITED STATES PATENT OFFICE.

JOHN J. HOPPES, OF SPRINGFIELD, OHIO.

HYDROELECTRIC POWER PLANT.

Application filed May 23, 1923. Serial No. 640,972.

*To all whom it may concern:*

Be it known that I, JOHN J. HOPPES, a citizen of the United States, residing at Springfield, in the county of Clark and State of Ohio, have invented certain new and useful Improvements in Hydroelectric Power Plants, of which the following is a specification.

My invention relates to a hydro-electric power plant.

An object of my invention is to provide a power plant of this character which will be of a simple and compact character capable of being installed at small streams for farm uses and the like.

A further object of my invention is to provide a plant of the character referred to in which is employed a water wheel of such a nature that it may be automatically governed by a governing mechanism of an inexpensive and simple character.

A further object of the invention is to provide a combined centrifugal and inertia governing mechanism for the purposes of governing a water wheel, which is capable of performing the governing operation by its own power, thus eliminating the necessity of providing supplemental power secured from the wheel shaft, as is common with all governing mechanism for water wheels of a practical nature; a more specific object in this connection being to provide a governor having weights which act by centrifugal force and inertia in one direction and by the inertia of the weights in conjunction with springs, in the opposite direction.

A further object of my invention is to provide, in connection with a type of plant referred to, a water wheel which employs blades of the propeller type together with simple and effective means of control by the governor by feathering the blades to present more or less of their faces to the action of the water.

A further object of the invention is to provide a plant of the character referred to which will be simple in construction, effective in operation, economical in manufacture and capable of being easily and readily installed; further objects in this connection being apparent from the accompanying description and claims.

In the accompanying drawings:

Fig. 1 is a vertical section of a power plant embodying the improvements.

Fig. 2 is a transverse section of the governing devices, the section being on the line 2—2 of Fig. 1.

Fig. 3 is a vertical section of the governing devices, the section being on the line 3—3 of Fig. 1.

Fig. 4 is detail in side elevation of a portion of the governing devices.

Fig. 5 is a section on the line 5—5 of Fig. 4.

Fig. 6 is a plan view in detail of the water wheel and a portion of the controlling devices for the blades of the same.

Fig. 7 is a vertical section of the water wheel and a portion of the blade controlling devices.

Fig. 8 is a perspective view of one of the controlling members for the water wheel blades.

Fig. 9 is a perspective view of a portion of one of the wheel blades.

Referring to the drawings, 1 represents a pipe or flume through which the water passes, this pipe in the present case having a horizontal portion 1' which forms the inlet for the water and a vertical portion 1" which forms the outlet. This pipe forms a support for a casing 2, being provided with suitable flanges to which the casing is connected, and also has integrally formed therewith a supporting bracket 3 upon which is mounted an electric generator 4 and a governing mechanism for the water wheel to be described.

The water wheel which is employed consists of a series of blades 5, four in number in the present case, of the propeller type, each of which has a trunnion 6 which is rotatably mounted in a bearing 7 formed in a housing preferably constructed of two separate parts 8 and 8' secured together by screws or bolts which pass through the openings 9; this head having connected therewith a vertical hollow shaft 10 which has its lower end journaled in a plain bearing 11 supported by a spider 12 and its upper end projected through an opening 13 in the bracket 3 and journaled in ball bearings 14 supported by a housing 15, which housing encloses the bevelled gear 16, connected with the shaft 10, and bevelled pinion 17, connected with the generator shaft, 18, by which motion is transmitted from the shaft 10 to the generator shaft.

The upper end of the shaft 10 is extended beyond the housing 15 and has connected therewith the governing mechanism to be described. A casing 19 has a removable lid 20, the casing and lid having central hub members 21 connected with the shaft 10 to rotate therewith.

Rotatably mounted upon the shaft 10 between the hub members 21 is a sleeve 22 having diametrically opposite pairs of arms 23. Mounted on vertical pivots 24, supported by the top and bottom of the casing are arms 25 which carry at their free ends weights 26 and are pivotally connected with the arms 23 by the links 27. It will be observed that the pivotal points 24 of the weights are much closer to the center of the orbit of the weights than the weights themselves so that the power of the inertia of the weights will act to move the weights in both directions of the swinging motion upon their pivots. Located in a slot 28 in the shaft 10 is a crosshead 29 which has projecting trunnions 30, formed by a bolt, which trunnions project through inclined slotted openings 31 formed in the sleeve 22 and are preferably provided with anti-friction rolls 32, held in position by the head 33 and nut 34 of the bolt. Coil springs 35 connect the weights 26 with the sides of the casing. Connecting the blades 5 of the wheel with the trunnions 30 is a rod 36 which passes through the shaft 10 and the cross-head, with the cross-head closely fitted thereto and cooperating with the walls of the slot 28 to form a guide therefor, the bolt passing through a transverse opening in said rod. The upper end of the rod projects beyond the shaft and has thereabout a coil spring 37, which is interposed between the lid 20 and a loose washer 38 held in place by the nut 39, threaded on the end of the rod and by means of which spring the rod is supported in a manner to permit endwise movement thereof. The lower end of the rod has fixed thereto a substantially square head 40 from the corners of which projects arms 41, each having a laterally projecting pin 42. This head is movably mounted in the space between the ends of the bearings 7, with each of the arms lying at the side of a bearing with its pin projecting across the space between the bearing and housing wall. The end of each trunnion 6 has a crank arm 43 which projects in a plane parallel with one of the arms 41 and has a slotted opening 44 into which projects the pin 42 of that arm.

The operation is as follows: Rotation of the shaft 10 when driven by the action of the water upon the blades 5 drives the generator 4 and rotates the governor weights 26 in a horizontal plane in the direction of the arrows in Fig. 2. As the weights move outwardly by centrifugal action and the power of inertia against the tension of the springs 35, the links 27 rotate the sleeve 22 and causes the walls of the inclined slots 31 to act as cams upon the trunnions 30 and thereby move the rod 36 endwise downwardly which in turn rotates the blades 5 through the connections described to present less of their faces to the water. As the speed of the parts decrease the weights are moved inwardly both by the springs 35 and the power of inertia, which movement rotates the sleeve 22 in the opposite direction, thereby moving the rod endwise upwardly and rotating the blades to present a greater pitch of their faces to the incoming water.

By the construction described it will be seen that a very compact and simple power plant is provided which may be easily transported to the place of installation and installed at small streams for farm purposes and other small power uses to give the most amount of power for a minimum cost. The arrangement eliminates the necessity of an expensive water wheel and a more expensive governor as well as shafting and its hangers, pulleys, bearings, gearing, etc., together with a power house in which to install the apparatus.

The arrangement enables me to employ a water wheel having propeller type of blades in connection with a governor to change the pitch of the faces of the blades by its own power, thus greatly simplifying the construction; the governor employed being of such a nature that centrifugal force and the power of inertia acts to move the propeller blades in one direction and springs in conjunction with the power of inertia move the blades in the opposite direction, which provide ample power for the purpose, thus obviating the necessity of the employment of supplementary power taken from the wheel shaft to accomplish this result as is the common practice in practical water wheel construction.

Having thus described my invention, I claim:

1. In a power plant of the character described, a water wheel comprising a series of blades of the propeller type each rotatable upon its axis, and a governing mechanism rotatable with said wheel and connected with said blades to change the pitch of the faces thereof to maintain a uniform speed of said wheel.

2. In a power plant of the character described, a water wheel comprising a series of blades of the propeller type each rotatable upon its axis, and a governing mechanism rotatable with said wheel having pivoted centrifugally-operated weights connected with said blades to change the pitch of the faces thereof and maintain a uniform speed of said wheel, each weight being movable upon its pivot in the plane of its rotation, with its pivotal point closer to the center of its orbit than the inactive position of the weight.

3. In a power plant of the character described, a water wheel comprising a series of blades of the propeller type each rotatable upon its axis, and a governing mechanism rotatable with said wheel, said governing mechanism comprising a plurality of pivoted weights movable on their pivots in the plane of rotation of the weights together with springs connected therewith, whereby the power of inertia together with the springs move the weights in one direction and centrifugal force and inertia in the opposite direction, together with means for connecting said weights with said blades to change the pitch of the faces of said blades to maintain a uniform speed of said wheel.

4. In a power plant of the character described, a water wheel comprising a series of blades of the propeller type each rotatable upon its axis, a shaft movable with said wheel, a generator, gearing for connecting said wheel shaft with the shaft of the generator, and a governing mechanism rotatable with said shaft and connected with said blades to shift the pitch of the faces thereof to maintain a uniform speed of said wheel.

5. In a power plant of the character described, a water wheel comprising a series of blades of the propeller type each rotatable upon its axis, a shaft connected to revolve with said wheel, a generator having its shaft connected to rotate with said wheel shaft, and a governing mechanism comprising a plurality of pivoted weights and springs connected therewith, said weights being movable upon their pivots in the plane of the rotary movement thereof, and means for connecting said weights with said blades whereby centrifugal force and the power of inertia cause said weights to rotate said blades upon their axes in one direction and the springs and the power of inertia cause the weights to move the blades upon their axes in the opposite direction.

6. In a power plant of the character described, a water wheel comprising a series of blades of the propeller type, each rotatable upon its axis, a hollow shaft connected with said blades to revolve therewith, a governing mechanism carried by said shaft comprising a plurality of pivoted weights and springs for said weights, a rod extending through said hollow shaft and connected with said blades, and means operated by said weights for moving said rod endwise in either direction.

7. In a power plant of the character described, a water wheel comprising a series of blades of the propeller type, each rotatable upon its axis, a hollow shaft connected with said wheel to rotate therewith, governing mechanism rotatably connected with said shaft comprising a series of pivoted weights movable upon their pivots in the plane of rotation thereof, a member rotatable upon said shaft and connected with said weights in a manner to cause said weights to impart rotary movement thereto, a rod in said hollow shaft connected with said blades, and a connection between said rod and said rotary member to impart endwise movement to said rod in either direction to rotate said blades upon their axes.

8. In a power plant of the character described, a water wheel comprising a series of blades of the propeller type, each rotatable upon its axis, a hollow shaft connected with said wheel to rotate therewith, a plurality of pivoted weights connected with said shaft to rotate therewith, a spring supported rod in said shaft and operatively connected at one end with said blades, a rotary member on said shaft and operatively connected with said weights, said rotary member having a pair of inclined slots, and projections on said rod located in said inclined slots whereby movement of said weights imparts endwise movement to said rod in either direction to turn said blades upon their axes.

9. In a power plant of the character described, a water wheel comprising a series of blades of the propeller type, each rotatable upon its axis, a hollow shaft connected with said wheel to rotate therewith, governing mechanism connected with said shaft to rotate therewith comprising pivoted weights, a rod in said hollow shaft, connections between said weights and rod to impart endwise movement to said rod in either direction, crank arms connected with said blades, and connections between said rod and said crank arms to rotate said blades upon their axes.

10. In a power plant of the character described, a water wheel comprising a series of blades of the propeller type, a housing having bearings in which said blades are rotatably mounted, a hollow shaft connected with said housing, governing mechanism rotatable with said shaft, a rod in said shaft connected with said governing mechanism whereby endwise movement in either direction is imparted to said rod, a crank arm connected with each blade, a head connected with said rod in proximity to said crank arms, and connections between said head and crank arm to rotate said blades by the movement of said rod.

11. In a governing mechanism for water wheels, the combination, with a wheel, devices for controlling the speed of the wheel including a pivoted weight revoluble with said wheel, said weight being so disposed as to cause the power of inertia thereof to act to move the same about its pivotal point in either direction dependent upon the speed of said wheel.

In testimony whereof, I have hereunto set my hand this 21st day of May, 1923.

JOHN J. HOPPES.